US012594784B2

(12) United States Patent
Seidel

(10) Patent No.: US 12,594,784 B2
(45) Date of Patent: Apr. 7, 2026

(54) ARRANGEMENT WITH A WHEEL AND A PLANAR COVER ELEMENT FOR A VEHICLE, COVER ELEMENT, WHEEL, AND VEHICLE

(71) Applicant: Bayerische Motoren Werke Aktiengesellschaft, Munich (DE)

(72) Inventor: Mike Seidel, Schoeneck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 410 days.

(21) Appl. No.: 18/029,706

(22) PCT Filed: Sep. 3, 2021

(86) PCT No.: PCT/EP2021/074339
§ 371 (c)(1),
(2) Date: Mar. 31, 2023

(87) PCT Pub. No.: WO2022/069151
PCT Pub. Date: Apr. 7, 2022

(65) Prior Publication Data
US 2023/0382157 A1 Nov. 30, 2023

(30) Foreign Application Priority Data
Oct. 1, 2020 (DE) ..................... 10 2020 125 677.9

(51) Int. Cl.
*B60B 7/04* (2006.01)
*B60B 3/02* (2006.01)
*B60B 7/06* (2006.01)

(52) U.S. Cl.
CPC .................. *B60B 7/04* (2013.01); *B60B 3/02* (2013.01); *B60B 7/065* (2013.01); *B60B 2900/1216* (2013.01)

(58) Field of Classification Search
CPC .............. B60B 7/04; B60B 7/065; B60B 3/02
(Continued)

(56) References Cited

U.S. PATENT DOCUMENTS

| | | | | |
|---|---|---|---|---|
| 2,129,115 A | * | 9/1938 | Best ........................ | B60B 19/10 |
| | | | | 188/264 G |
| 2,757,982 A | * | 8/1956 | Lyon ........................ | B60B 7/10 |
| | | | | 301/37.31 |

(Continued)

FOREIGN PATENT DOCUMENTS

| | | | | |
|---|---|---|---|---|
| CN | 108349299 A | * | 7/2018 | ............... B60B 3/10 |
| DE | 102011079599 A1 | * | 1/2013 | ............. B60B 7/065 |

(Continued)

OTHER PUBLICATIONS

International Search Report (PCT/ISA/210) issued in PCT Application No. PCT/EP2021/074339 dated Dec. 22, 2021 with English translation (four (4) pages).

(Continued)

*Primary Examiner* — S. Joseph Morano
*Assistant Examiner* — Eva L Comino
(74) *Attorney, Agent, or Firm* — Crowell & Moring LLP

(57) ABSTRACT

An arrangement includes a wheel and at least one sheet-shaped covering element. The wheel has a respective free space between at least two spokes that are adjacent in the circumferential direction. The covering element and rim are configured such that a gap is formed in the region of the step from the arrangement of the covering element relative to the rim creates an at least two-fold deflection of a flow passing through the gap from an inside of the vehicle toward an outside of the vehicle or from the outside of the vehicle toward the inside of the vehicle.

16 Claims, 6 Drawing Sheets

(58) Field of Classification Search
 USPC ..................................................... 301/37.31
 See application file for complete search history.

(56) References Cited

U.S. PATENT DOCUMENTS

| | | | | |
|---|---|---|---|---|
| 2,761,530 | A * | 9/1956 | Dawley | F16D 65/827 |
| | | | | 301/37.39 |
| 3,059,730 | A * | 10/1962 | Nickell | F16D 55/228 |
| | | | | 188/71.6 |
| 6,609,763 | B1 * | 8/2003 | Kinstler | B60B 7/063 |
| | | | | 301/37.31 |
| 6,805,413 | B2 * | 10/2004 | Fitzgerald | B60B 7/0053 |
| | | | | 301/37.101 |
| 8,382,211 | B2 * | 2/2013 | Renius | B60B 7/065 |
| | | | | 301/37.102 |
| 9,493,031 | B2 * | 11/2016 | Dick | B60B 3/02 |
| 2011/0291465 | A1 * | 12/2011 | Peschiutta | B60B 7/04 |
| | | | | 301/37.102 |
| 2012/0020856 | A1 * | 1/2012 | Pollack | B01J 20/12 |
| | | | | 423/210 |
| 2013/0020856 | A1 * | 1/2013 | Dick | B60B 7/04 |
| | | | | 301/37.107 |
| 2013/0307321 | A1 * | 11/2013 | Mengle | B60B 7/065 |
| | | | | 301/37.107 |
| 2020/0384800 | A1 * | 12/2020 | Seidel | F16F 15/345 |

FOREIGN PATENT DOCUMENTS

| | | | | |
|---|---|---|---|---|
| DE | 102018200828 A1 * | 7/2019 | ............ | B60B 7/065 |
| DE | 10 2018 203 805 A1 | 9/2019 | | |
| EP | 0301553 B1 * | 1/1991 | ............ | B60B 19/10 |
| FR | 3 065 397 A1 | 10/2018 | | |
| FR | 3065397 B1 * | 1/2020 | .............. | B60B 7/16 |
| WO | WO 2019/121410 A1 | 6/2019 | | |

OTHER PUBLICATIONS

German-language Written Opinion (PCT/ISA/237) issued in PCT Application No. PCT/EP2021/074339 dated Dec. 22, 2021 (six (6) pages).
German-language Search Report issued in German Application No. 10 2020 125 677.9 dated Jul. 6, 2021 with partial English translation (12 pages).

* cited by examiner

ARRANGEMENT WITH A WHEEL AND A PLANAR COVER ELEMENT FOR A VEHICLE, COVER ELEMENT, WHEEL, AND VEHICLE

BACKGROUND AND SUMMARY

The present invention relates to an arrangement, preferably for a two-track motor vehicle, in particular for a passenger car, wherein the arrangement comprises a wheel and a sheet-shaped covering element, wherein the wheel comprises a rim, a hub and multiple spokes distributed around a wheel axis of rotation in the circumferential direction, wherein the rim is connected to the hub by the spokes, wherein the wheel has a respective free space between at least two spokes that are adjacent in the circumferential direction, and wherein at least one sheet-shaped covering element at least partially covers at least one free space. In this respect, the free space, on an outer side of the rim in relation to a functional installation state of the arrangement in a vehicle, has on its inner edge a slight step extending at least in certain portions along the edge. Here, the covering element is designed and arranged in such a way that an inner surface, facing toward the rim, of the covering element, together with an outer surface of the outer side of the rim, forms a gap in the region of the step.

The present invention furthermore relates to a sheet-shaped covering element for a wheel, and to a wheel for a vehicle, preferably for a two-track vehicle, in particular for a passenger car.

Arrangements having a wheel and at least one sheet-shaped covering element are known in principle from the prior art, for example from WO 2019/121410 A1 or DE 10 2011 079 599 A1.

A wide variety of requirements are placed on such arrangements for vehicles, in particular for passenger cars. In addition to sufficient strength of the wheel along with a low weight, such arrangements moreover should contribute to a good drag coefficient of the vehicle and in the process furthermore also be distinguished by a pleasant visual appearance.

Against this background, an object of the present invention is to provide an alternative arrangement, in particular an improved arrangement, which on the one hand is advantageous in terms of a drag coefficient of the vehicle, in particular in terms of the Cx value, which on the other hand, however, in particular enables both sufficient brake cooling and sufficient water runoff, or dirt egress, from an inner side of the wheel toward the outside of the vehicle.

Another object of the present invention is to provide a corresponding sheet-shaped covering element suitable for this and a corresponding wheel suitable for this, and an improved vehicle.

This object is achieved by an arrangement, by a sheet-shaped covering element, by a wheel and by a vehicle, having the features of the independent claims. The dependent claims relate to advantageous and preferred configurations of the invention, which are explained in more detail below. The wording of the claims is incorporated in the description by express reference.

An arrangement according to the present invention is preferably designed for a two-track motor vehicle, in particular for a passenger car, and comprises a wheel and at least one sheet-shaped covering element, wherein the wheel comprises a rim, a hub and multiple spokes distributed around a wheel axis of rotation in the circumferential direction. In this respect, the rim is connected to the hub by the spokes, wherein the wheel has a respective free space between at least two spokes that are adjacent in the circumferential direction, and wherein at least one sheet-shaped covering element at least partially covers at least one free space. In this respect, the free space, on an outer side of the rim in relation to a functional installation state of the arrangement in a vehicle, i.e. in particular on a side situated toward the outside of the vehicle, has on its inner edge a slight step extending at least in certain portions along the edge. In this case, the covering element is designed and arranged in such a way that an inner surface, facing toward the rim, of this covering element, together with an outer surface of the outer side of the rim, forms a gap in the region of the step.

Here, an arrangement according to the invention is characterized in that the gap resulting in the region of the step from the arrangement of the covering element relative to the rim causes an at least two-fold deflection of a flow passing through the gap from the inside of the vehicle toward the outside of the vehicle or from the outside of the vehicle toward the inside of the vehicle.

The only partial sheet-shaped covering of the free space by the covering element makes it possible to ensure that enough cooling air enters or passes through the rim from the outside of the vehicle to the brake.

The two-fold flow deflection inside the gap can achieve a particularly good aerodynamic closing action of the gap that has an advantageous effect on the drag coefficient of a vehicle in a functional installation state of the arrangement in a vehicle.

An arrangement according to the invention makes it possible particularly easily to reduce in particular a mass flow of an air flow passing through the gap from the outside of the vehicle toward the inside of the vehicle, as a result of which, presupposing a corresponding configuration of the arrangement in all other respects, a drag coefficient of a vehicle can consequently be significantly reduced, in particular the drag coefficient in the longitudinal direction, i.e. what is referred to as the Cx value. Given a corresponding configuration of the arrangement, in particular of the gap geometry, it is possible to achieve approximately two Cx points in this way. That is to say, the Cx value of a vehicle can in this way be reduced by approximately two Cx points, and thus significantly.

At the same time, given a corresponding configuration of the gap geometry, it is furthermore possible to ensure sufficient water runoff, or sufficient egress of dirt, through the gap from a side of the wheel or the arrangement that is situated toward the inside of the vehicle toward the outside of the vehicle.

Within the meaning of the present invention, here the term "free space" is understood to mean a cutout or a through-opening between two spokes, through which a medium, such as, for example, air and/or water and/or dirt or the like, can pass from the outside of the vehicle toward the inside of the vehicle, or vice versa.

Within the meaning of the present invention, a "sheet-shaped covering element" is a constituent part with a sheet-shaped form that is designed to at least partially cover a side of a wheel that is situated toward the outside of the vehicle, in relation to a functional installation state of the wheel in a vehicle, wherein in this respect the sheet-shaped covering element can be formed from one part, i.e. can be formed in one piece, or else assembled from multiple individual constituent parts. Within the meaning of the invention, here a sheet-shaped covering element has in particular a small thickness compared to its surface area and is preferably designed to cover at least one free space at least partially in the circumferential direction and at least partially in the radial direction.

Within the meaning of the present invention, here an "inner edge" of the free space is in particular an edge which delimits the free space with respect to the rest of the wheel, wherein the inner edge in particular runs around the free space, or the opening forming the free space.

Within the meaning of the present invention, a "step" is understood to mean in particular a staircase step-shaped offset, in particular an offset with only a single step, wherein it is not imperatively necessary for the offset to have surfaces adjoining one another at right angles, as is normally the case for a staircase step, but it can also have surfaces adjoining one another at a different angle, provided that the offset is still similar to a staircase step. Preferably, however, at least two surfaces that adjoin one another and form the offset are, however, arranged at an angle of approximately 90° or exactly 90° in relation to one another.

Within the meaning of the present invention, here a "slight step" is in particular a step or an offset with an offset depth or a height of a shoulder adjoining the offset of less than 20 mm, 15 mm or 10 mm, in particular of less than 5 mm, particularly preferably of less than 2.5 mm.

Within the meaning of the present invention, an "inner surface" of the sheet-shaped covering element is a surface of the covering element of an arrangement according to the invention that faces toward the wheel and in particular faces in the direction of the inside of the vehicle in a functional installation state of the arrangement in a vehicle.

An outer side of the wheel or the rim is in particular a side of the wheel or the rim that faces toward a vehicle outer side in a functional installation state of the arrangement or of the wheel in a vehicle.

Particularly preferably, in this respect the covering element and the rim are designed and arranged relative to one another in such a way that an average flow direction of a flow flowing through the gap changes at least twice as the flow passes through the gap. This makes it possible to provide an aerodynamically particularly advantageous arrangement according to the invention.

Particularly preferably, the slight step is located on the outer side of the rim in this respect in a radially outer region of the rim, in particular in a region adjoining an external rim flange radially on the inside. This makes it possible to provide an aerodynamically particularly advantageous arrangement according to the invention.

In a particularly advantageous configuration of an arrangement according to the invention, in particular in a particularly advantageous configuration of a wheel according to the invention, in this respect the slight step extends in particular at least in certain portions along a radially outer edge of the free space, preferably at least over part of the width of the free space in the circumferential direction, in particular over the entire width of the free space. This makes it possible to provide an aerodynamically particularly advantageous arrangement according to the invention.

As an alternative or in addition, however, it is also possible for a step, in particular a slight step, to be arranged or formed on one or on both sides of the free space adjoining the spokes and/or in a radially inner region, in particular on a radially inner side of the free space in the direction of the hub. This can also lead to advantageous aerodynamics in individual cases.

Within the meaning of the present invention, the directional indication "in the circumferential direction" here relates to a direction of rotation about the wheel axis of rotation, whereas the directional indication "radial" denotes a direction which is perpendicular to an axial direction and a circumferential direction in relation to the wheel axis of rotation. The directional indication "axial" denotes a direction parallel to the wheel axis of rotation of the wheel or of the arrangement, as is conventional in the art.

Particularly preferably, all respective free spaces between two respective spokes of the wheel are at least partially covered by a covering element, preferably by a respective separate covering element or by a respective common covering element, and, together with the wheel or the rim, form a gap according to the invention designed as described above. This makes it possible to provide an aerodynamically particularly advantageous arrangement according to the invention.

In a further advantageous configuration of an arrangement according to the present invention, the gap is in particular designed to enable at least partial passage of a fluid and/or particle flow, in particular of water and/or small dust and/or dirt particles, from an inner side of the wheel toward the outside of the vehicle. This makes it possible to provide a particularly advantageous arrangement according to the invention, in particular an arrangement by means of which it is possible to achieve both an advantageous drag coefficient of a vehicle and at the same time a sufficient flow of water and/or dust and/or dirt from an inner side of the wheel toward the outside of the vehicle.

A "passage" in this respect is in particular understood to mean a passage of a flow all the way through from the outside of the vehicle toward the inside of the vehicle, or vice versa, through the entire gap between the sheet-shaped covering element and the rim of the wheel.

Within the meaning of the present invention, in this respect a "fluid and/or particle flow" is in particular a mass flow of a fluid and/or a particle mass flow and/or a combination of these.

In a further advantageous configuration of an arrangement according to the present invention, the gap is in particular designed to obstruct at last partial passage of a fluid and/or particle flow, in particular an air flow, from the outer side of the wheel toward the inside of the vehicle, preferably in such a way that only a small proportion of a fluid and/or particle flow entering the gap reaches the inner side of the wheel, in particular only a proportion of less than 70%, 60%, 50%, 40%, 30%, 20% or 10% of a fluid and/or particle flow entering the gap on the outer side of the wheel. This makes it possible to provide an aerodynamically particularly advantageous arrangement according to the invention. The more the passage of a fluid and/or particle flow through the gap toward the inside of the vehicle is obstructed here, the more advantageous an effect this has on the drag coefficient of a vehicle, in particular on the Cx value, wherein an egress of water and/or dirt and/or dust toward the outside of the vehicle can always be ensured by the continually present gap, i.e. by an ever-present opening.

In a further advantageous configuration of an arrangement according to the present invention, the two-fold flow deflection of the gap is in particular configured in such a way here that a fluid and/or particle flow, in particular an air flow, entering the gap from the outer side of the wheel is deflected in such a way that a large proportion of the fluid and/or particle flow exits the gap on the outer side of the wheel back toward the outside of the vehicle again, in particular a proportion of more than 30%, 40%, 50%, 60%, 70%, 80% or 90% of the fluid and/or particle flow that has entered the gap. This makes it possible to achieve a particularly advantageous aerodynamic action of the arrangement, in particular an advantageous aerodynamic action in terms of the drag coefficient, primarily in terms of the Cx value.

In a further, particularly preferred configuration of an arrangement according to the present invention, here the gap extends in the flow direction preferably at least in certain portions, in particular over a large proportion of its length, particularly preferably over more than half of its length, approximately in the direction of the wheel axis of rotation, wherein the gap particularly preferably runs at an angle of at most ±30°, ±25°, ±20°, ±15°, ±10° or ±5° or ±2° in relation to the wheel axis of rotation, in particular along a straight line or parallel to the wheel axis of rotation. This makes it possible on the one hand to ensure sufficient obstruction of the passage of an air flow in the direction toward the inside of the vehicle, as a result of which particularly advantageous aerodynamics of the arrangement can be achieved, but on the other hand to ensure good egress of water and/or dust and/or dirt.

In a particularly advantageous configuration of an arrangement according to the present invention, in particular in order to achieve the two-fold deflection of the flow as it passes through the gap, the gap comprises at least three gap portions, in particular an outer gap portion, a middle gap portion and an inner gap portion, wherein the middle gap portion is arranged between the outer gap portion and the inner gap portion in relation to a flow direction through the gap, and in particular directly adjoins the outer gap portion and/or the inner gap portion, preferably by way of a respective end. Particularly preferably, the middle gap portion in this respect adjoins the outer gap portion by way of a respective end and the inner gap portion by way of the other end. This makes it possible to easily achieve a particularly advantageous geometric configuration of the gap, in particular an aerodynamically advantageous configuration of the gap. Primarily, this makes it possible to particularly easily achieve a two-fold deflection of the flow direction and consequently particularly easily achieve advantageous aerodynamics of the arrangement.

In a further advantageous configuration of an arrangement according to the present invention, in particular in a development, the inner gap portion and/or the outer gap portion preferably extend in the direction of the wheel axis of rotation and/or substantially parallel to the wheel axis of rotation, in particular in at least one sectional plane, preferably in an angular range of at most ±60°, ±45°, ±30°, ±25°, ±20°, ±15°, ±10°, at most ±5° or at most ±2° about the wheel axis of rotation, in particular at an angle of ±60°, ±45°, ±30°, ±25°, ±20°, ±15°, ±10°, ±5° or ±2° in relation to the wheel axis of rotation, in particular in such a way that a flow flowing through the outer and/or the inner gap portion at least substantially runs at least partially parallel to the wheel axis of rotation, particularly preferably predominantly parallel to the wheel axis of rotation. This makes it possible to have the effect of aerodynamically particularly advantageously influencing the flow of an air flow entering the gap or a flow passing through the gap.

In a further advantageous configuration of an arrangement according to the present invention, in particular in a refinement, the middle gap portion particularly preferably extends in the direction of the wheel axis of rotation or substantially parallel to a vertical plane extending perpendicularly in relation to the wheel axis of rotation, in particular at least in at least one sectional plane, preferably in an angular range of at most ±30°, ±25°, ±20°, ±15°, ±10°, ±5° or ±2° in relation to this vertical plane, in particular at an angle of ±30°, ±25°, ±20°, ±15°, ±10°, ±5° or ±2° in relation to this vertical plane. Particularly preferably, in this respect the middle gap portion extends in particular in such a way that a flow flowing through the middle gap portion runs at least partially perpendicularly in relation to the wheel axis of rotation, in particular predominantly perpendicularly in relation to the latter. This makes it possible to have the effect of aerodynamically particularly advantageously influencing the flow of an air flow entering the gap or a flow passing through the gap.

In a further advantageous configuration of an arrangement according to the present invention, in particular in a development, preferably the outer gap portion and the middle gap portion are arranged relative to one another and designed in such a way that a flow passing through has its direction deflected by 45°, 60° or 75°, preferably by 90° or by more than 90°, but in particular by no more than 105°, 120°, 130° or 135° or 150° or 160°. By means of such a first flow deflection inside the gap, the passage of an air mass flow entering the gap from the outside of the vehicle can be obstructed particularly well such that only a small proportion of the air mass flow passes through in the direction toward the inside of the vehicle, while in particular at the same time sufficient egress of a fluid and/or particle flow or passage from the inside of the vehicle toward the outside of the vehicle can be ensured.

Particularly preferably, in this respect the outer gap portion and the middle gap portion are designed and arranged relative to one another in such a way that an average flow direction of a flow flowing through the outer gap portion and the middle gap portion changes by at least 45°, 60° or 75°, preferably by 90° or more than 90°, but in particular by no more than 105°, 120°, 130° or 135° or 150° or 160° as it passes through the middle gap portion and the outer gap portion.

In a further advantageous configuration of an arrangement according to the present invention, in particular in a development, the middle gap portion and the inner gap portion are designed and arranged relative to one another in such a way that a flow flowing through them has its direction deflected by at least 45°, 60° or 75°, preferably by 90° or more than 90°, but in particular by no more than 105°, 120°, 130°, 135° or 150° or 160°. By means of such a second flow deflection inside the gap, the passage of an air mass flow entering the gap from the outside of the vehicle can be obstructed particularly well such that only a small proportion of the air mass flow passes through in the direction toward the inside of the vehicle, while in particular at the same time sufficient egress of a fluid and/or particle flow or passage from the inside of the vehicle toward the outside of the vehicle can be ensured.

Particularly preferably, the middle gap portion and the inner gap portion are arranged relative to one another and designed in such a way that an average flow direction of a flow flowing through the middle gap portion and the inner gap portion changes by at least 45°, 60° or 75°, preferably by 90° or more than 90°, but in particular by no more than 105°, 120°, 130°, 135° or 150° or 160° as it passes through these two gap portions.

In a particularly preferred configuration of an arrangement according to the invention, in this respect at least one of the gap portions, in particular all the gap portions, run(s) at least in certain portions in a straight line. This makes it possible to achieve a particularly simple geometric configuration of the arrangement, in particular of the gap.

Particularly preferably, the outer gap portion and the middle gap portion adjoin one another to form the first flow deflection inside the gap, in relation to a throughflow direction from the outside of the vehicle toward the inside of the vehicle, at an internal angle of approximately 45° to 135°, in particular at an internal angle of at most 135°, 120°, 105° or 90°, but particularly preferably at an internal angle of at least 45°, 60° or 75°. Particularly preferably, the internal angle between the outer gap portion and the middle gap portion is substantially 90° or exactly 90°.

Particularly preferably, the middle gap portion and the inner gap portion, in particular likewise, adjoin one another to form the second flow deflection inside the gap, in relation to a throughflow direction from the outside of the vehicle toward the inside of the vehicle, at an internal angle of approximately 45° to 135°, in particular at an internal angle of at most 135°, 120°, 105° or 90°, but particularly preferably at an internal angle of at least 45°, 60° or 75°. Particularly preferably, the internal angle between the middle gap portion and the inner gap portion is substantially 90° or exactly 90°.

In a further advantageous configuration of an arrangement according to the present invention, the inner surface of the covering element extends in particular at least partially in the radial direction and in the circumferential direction of the wheel, in particular in the circumferential direction over the entire width of the free space and in the radial direction only over part of the free space.

Particularly preferably, the covering element furthermore comprises in particular a projection extending at least partially in the vehicle transverse direction and at least partially in the circumferential direction, preferably a projection extending from the inner surface in the direction of the inside of the vehicle, in each case in relation to a functional installation state of the arrangement in a vehicle, wherein the projection particularly preferably extends virtually over the entire width of the free space in the circumferential direction, and wherein further preferably in particular a radial outer surface of the projection, together with an opposite radial inner surface of the rim, forms the inner gap portion of the gap. This makes it possible to particularly easily configure a gap that enables a flow passing through from the inside of the vehicle toward the outside of the vehicle or from the outside of the vehicle toward the inside of the vehicle, after it enters the gap and before it exits the gap, to have its direction deflected at least twice, in particular in connection with a slight step formed on the outer side of the rim.

In a further advantageous configuration of an arrangement according to the present invention, in particular in a development, in this respect a region, radially on the outside of the projection, of the inner surface of the covering element, together with an opposite outer surface of the slight step, forms the middle portion of the gap, i.e. the middle gap portion, wherein the outer surface of the step preferably likewise extends at least partially in the radial direction and in the circumferential direction of the wheel, in particular moreover over the entire width of the free space in the circumferential direction. This makes it possible to particularly easily configure a gap that enables a flow passing through from the inside of the vehicle toward the outside of the vehicle or from the outside of the vehicle toward the inside of the vehicle, after it enters the gap and before it exits the gap, to have its direction deflected at least twice, in particular in connection with a slight step formed on the outer side of the rim.

In a further advantageous configuration of an arrangement according to the present invention, in particular in a development, a radial outer surface, extending at least partially in the circumferential direction of the wheel and in particular over the entire width of the free space in the circumferential direction, of the covering element, together with an opposite, radial inner surface of the rim, in particular together with a radial inner surface of the rim underneath the outer rim flange, forms the outer gap portion, wherein the radial inner surface of the rim preferably likewise extends at least partially in the radial direction and in the circumferential direction of the wheel, in particular, and preferably likewise, over the entire width of the free space in the circumferential direction. This makes it possible to particularly easily configure a gap that enables a flow passing through from the inside of the vehicle toward the outside of the vehicle or from the outside of the vehicle toward the inside of the vehicle, after it enters the gap and before it exits the gap, to have its direction deflected at least twice, in particular in connection with a slight step formed on the outer side of the rim.

Particularly preferably, in this respect the gap in particular is designed in such a way, in particular a respective gap width is dimensioned in such a way, that water and/or dirt and/or dust can exit through the gap from an inner side of the wheel to the outer side, but an air flow entering the gap from an outer side is at least partially prevented from passing through in the direction of the inner side. Particularly preferably, in this respect the gap has a gap width of less than 5 mm, in particular less than 4 mm, 3 mm, 2 mm or 1.5 mm, but preferably not less than 0.5 mm, 0.6 mm, 0.7 mm, 0.8 mm or 0.9 mm, over its entire length from the outside of the vehicle toward the inside of the vehicle.

Particularly preferably, in this respect, in the circumferential direction of the covering element, for a respective defined coordinate value in the vehicle transverse direction, the gap has a constant width, in particular over the entire width of the covering element in the circumferential direction. This makes it possible to have the effect of particularly evenly influencing the air flow, in particular particularly evenly obstructing the air flow. As an alternative, however, for a defined, constant coordinate value in the vehicle transverse direction, the gap can also have a variable width in the circumferential direction of the covering element.

Over its length in the throughflow direction from an inlet or outlet opening situated toward the outside of the vehicle to an outlet or inlet opening, respectively, situated toward the inside of the vehicle, the gap can either have a constant gap width or else a different gap width, or a gap width that varies over its length in the throughflow direction. Particularly preferably, a gap width in the throughflow direction decreases from the inlet or outlet opening situated toward the outside of the vehicle in the direction toward the outlet or inlet opening, respectively, situated toward the inside of the vehicle preferably at least in certain portions. This makes it possible to achieve particularly advantageous obstruction of the passage of an air flow that has entered the gap.

In some cases, it can be advantageous if the gap has a smaller gap width in the region of the inlet or outlet opening situated toward the outside of the vehicle, i.e. on the outer side of the wheel, than in the region of the outlet or inlet opening, respectively, situated toward the inside of the vehicle, i.e. than on the inner side of the gap.

In a further advantageous configuration of an arrangement according to the present invention, in particular in a development, the projection of the covering element that extends away from the inner surface of the covering element is at least partially formed by a protruding rib and/or wall.

In a particularly preferred configuration of an arrangement according to the invention, the sheet-shaped covering element of an arrangement according to the invention is produced from plastic, in particular is a plastics injection molded part, which is particularly formed in one piece, i.e. particularly preferably the rib and/or wall forming the projection of the covering element that, together with the rim, forms the gap is formed in one piece with the rest of the covering element.

In this respect, the covering element may be a 1-component constituent part, i.e. be produced from a single material, or else a 2-component constituent part, i.e. a 2C constituent part, which is produced from two different materials. Moreover, the covering element can alternatively also be a multiple-component constituent part and be produced from more than two materials. A 2C constituent part or a 2C covering element is particularly preferably produced by an injection molding process, in particular by a 2C plastics injection molding process.

At least one covering element of an arrangement according to the invention may, however, instead of being formed in one piece, also be composed of multiple parts, for example a plastics injection molded part which comprises the inner surface and a separate plastics constituent part which forms the projection. In this respect, the projection can be fastened to the inner surface of the covering element, for example by clamping and/or adhesive bonding, or connected to the inner surface by means of a latching connection.

Instead of being formed by a projecting, in particular single rib and/or by a wall, the projection can alternatively also be formed by a foam element and/or a rubber lip or the like, which in particular, however, does not rest against the rim with sealing action, with the result that a gap width that is necessary for sufficient water runoff or sufficient dirt and/or dust egress is always ensured.

The covering element can in principle also be made at least partially or completely from fiber-reinforced plastics material, or at least partially comprise fiber-reinforced plastics material.

In a particularly advantageous configuration of an arrangement according to the invention, at least one covering element on its inner side, in addition to a projection, furthermore has one or more flow conducting elements, which extend in particular likewise from an inner surface in the direction of an outer surface of the wheel and in this respect can rise, or extend away, from the inner surface in particular parallel to the wheel axis of rotation. This makes it possible to have the effect of particularly advantageously influencing the flow. In particular, this flow conducting element can be used to achieve a particularly advantageous conduction and/or orientation of the flow. In particular, the use of this flow conducting element makes it possible to have an advantageous influence on the egress of water and/or dust and/or dirt from a wheel inner side toward the outside of the vehicle, in particular to conduct or guide water and/or dirt and/or dust particles through it in the direction of the gap, with the result that they can exit from the inside of the vehicle toward the outside of the vehicle through the gap.

The covering element may also moreover have one or more reinforcing ribs or the like.

One or more ribs and/or walls and/or flow conducting elements can in this respect also have a dual function and in particular serve both as reinforcing rib and as flow conducting element.

To fasten the sheet-shaped covering element to the wheel, the covering element may have one or more connecting means, wherein, in a particularly advantageous configuration of an arrangement according to the invention, the covering element can be fastened to the wheel by means of a latching connection and, to that end, may particularly preferably have corresponding latching means or the like.

Particularly preferably, the wheel of an arrangement according to the invention preferably likewise has appropriate and correspondingly formed connecting means suitable for interacting with the covering element, in particular, for example, appropriate latching means, such as latching cutouts and/or latching hooks or the like.

In principle, the sheet-shaped covering element may also be or have been fastened to the wheel in another way, for example by adhesive bonding as described in DE 10 2011 079 599 A1, which was already mentioned in the introduction.

It goes without saying that, in this respect, however, the covering element in particular is not or has not been connected to the rim or the wheel by adhesive bonding in the region of the gap, since in this case sufficient water and/or dirt egress through the gap would no longer be ensured.

A sheet-shaped covering element according to the present invention is designed in particular for a wheel and characterized in that it is designed to produce an arrangement according to the invention that was described above.

A wheel according to the present invention is preferably designed for a two-track motor vehicle, in particular for a passenger car, and characterized in that it is designed to produce an arrangement according to the invention.

A vehicle according to the invention is in particular a two-track motor vehicle, particularly preferably a passenger car, and characterized in that it comprises an arrangement according to the invention.

These and further features will emerge not only from the claims and the description but also from the figures, where the individual features can be realized in each case individually or as a plurality in the form of subcombinations in an embodiment of the invention and can constitute advantageous and inherently protectable embodiments, provided that the combination of these features can be implemented from a technical perspective.

The invention will be explained in more detail below with reference to multiple preferred exemplary embodiments, wherein to that end the invention is schematically illustrated in the appended figures.

In this respect, all the features described in more detail and/or identifiably illustrated in the appended figures may be essential to the invention.

DETAILED DESCRIPTION OF THE DRAWINGS

Figures 1, 2:
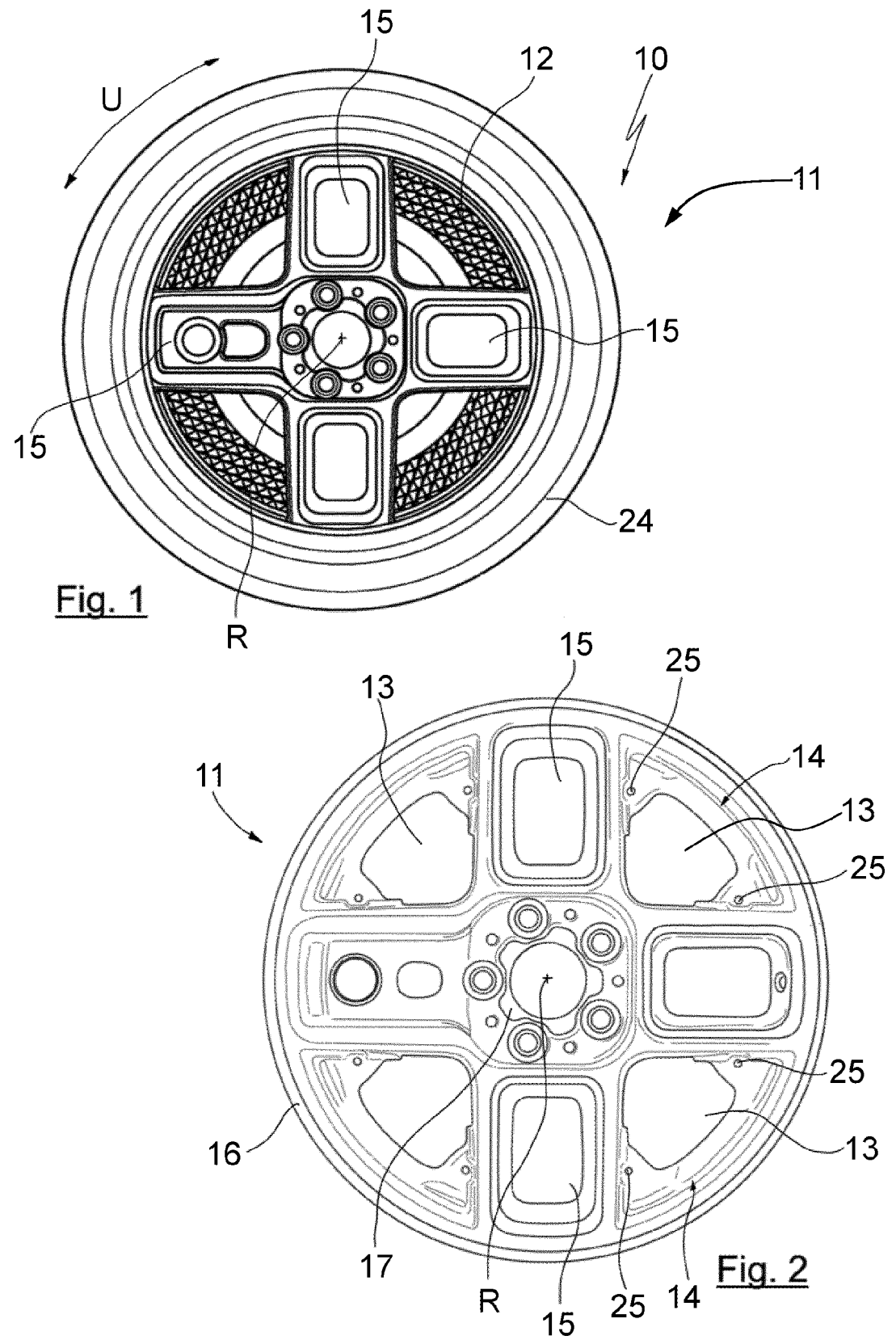
FIG. 1 shows an exemplary embodiment of an arrangement according to the invention having a wheel and multiple covering elements in a first exemplary embodiment in a view of the arrangement from the outside of the vehicle, in relation to a functional installation state of the arrangement in a vehicle.
FIG. 2 shows the wheel of FIG. 1 depicted in an enlarged illustration as an individual part, likewise in a view from the outside of the vehicle.

FIG. 1 shows an exemplary embodiment of an arrangement 10 having a wheel 11 and multiple covering elements 12 in a first exemplary embodiment in a view of the arrangement 10 from the outside of the vehicle, in relation to a functional installation state of the arrangement 10 in a vehicle. FIG. 2 shows the wheel 11 in an enlarged illustration as an individual part, likewise in a view from the outside of the vehicle, wherein the arrangement 10 is designed for a two-track motor vehicle, in particular for a passenger car.

In this case, the wheel 11 has a rim 16 with a tire 24 fitted onto it, a hub 17 and multiple spokes 15 distributed around a wheel axis of rotation R in the circumferential direction U, wherein the rim 16 is connected to the hub 17 by the spokes 15.

Between two adjacent spokes 15, the wheel 11 has a respective free space 13 in the form of a through-opening, which extends from a side of the wheel 11 situated toward the outside of the vehicle to a side of the wheel 11 situated toward the inside of the vehicle and enables the passage of cooling air from the outside of the vehicle toward the inside of the vehicle, and of water and dirt and dust from the inside of the vehicle toward the outside of the vehicle.

Each of the free spaces 13 between two adjacent spokes 15 is in this respect at least partially covered by a sheet-shaped covering element 12, in particular on a respective radially outer edge of the associated free space 13. To fasten the covering elements 12, the wheel 11 has respective corresponding fastening holes 25 laterally next to the free spaces 13 in the circumferential direction U.

Each free space 13, on an outer side of the rim 16, has on its inner edge, in particular on its inner edge radially on the outside, a slight step 14 which extends at least partially along this edge and can be readily seen in particular illustrated in FIGS. 3 to 7.

Figure 3:
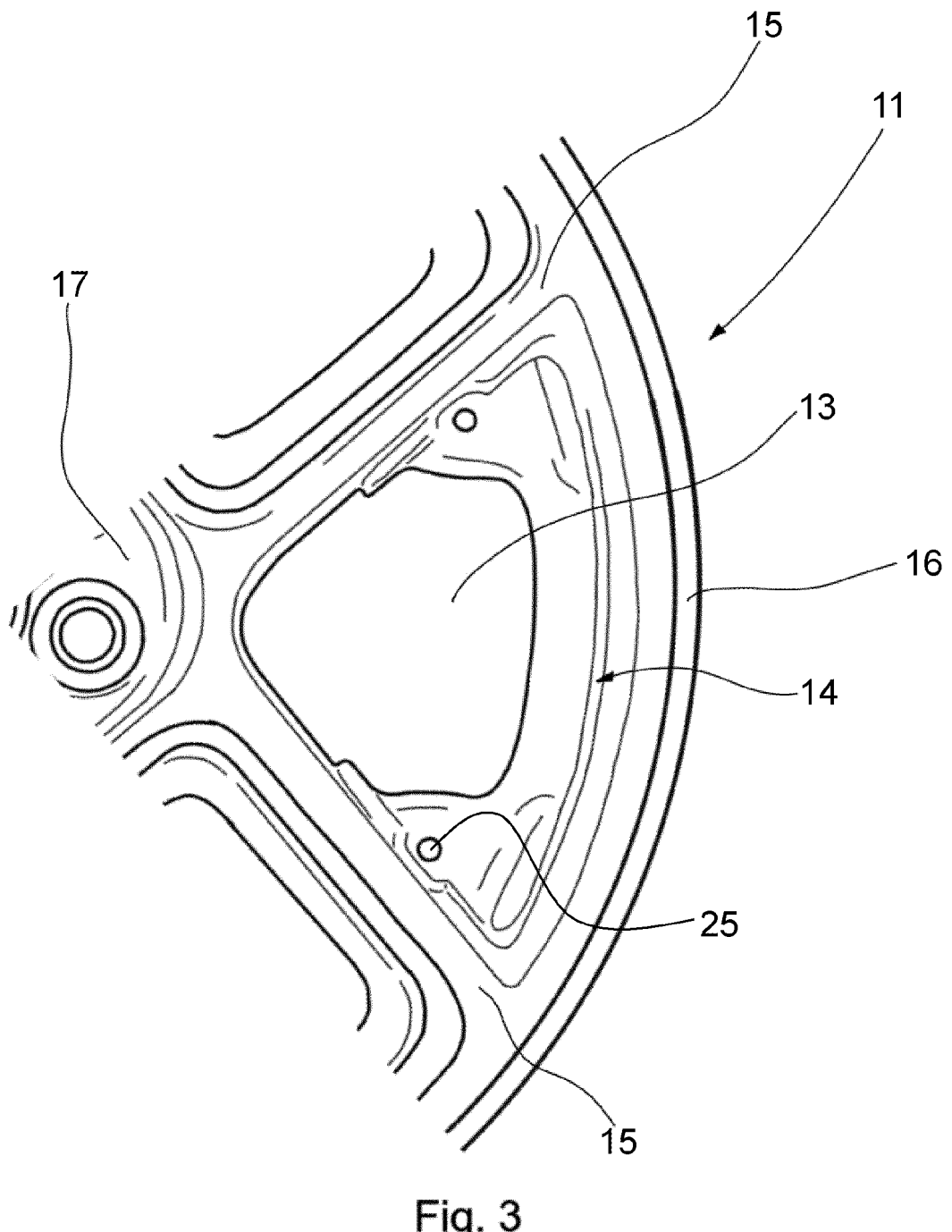
FIG. 3 is an enlarged detail of the wheel of FIG. 2 in the region of a free space.
Figure 4:
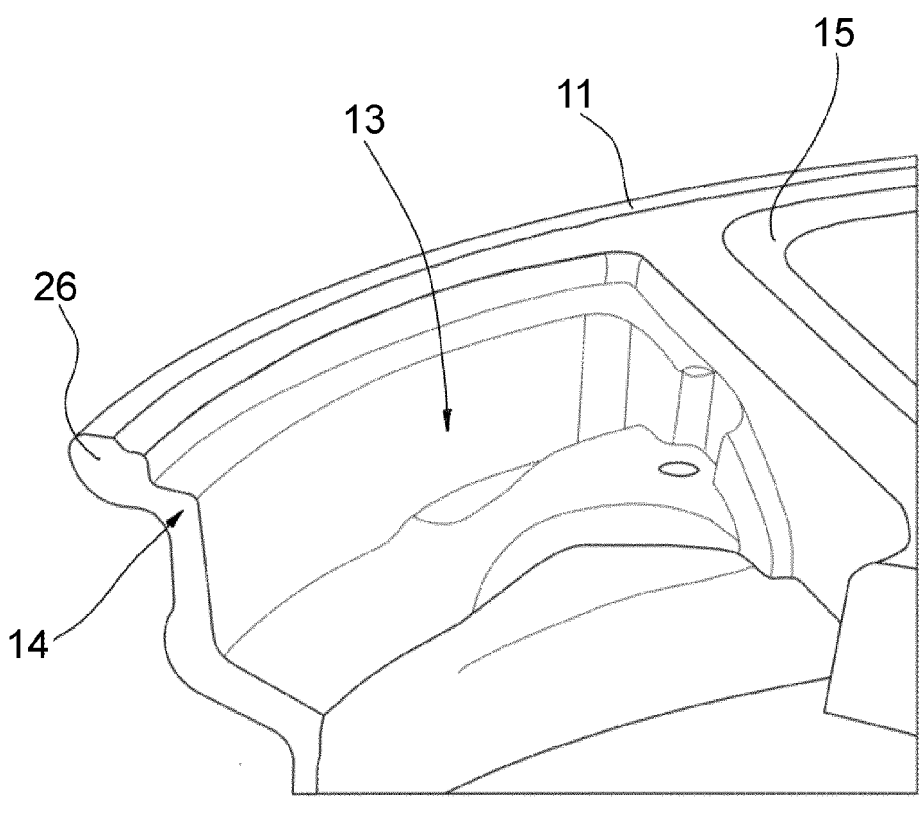
FIG. 4 is a perspective illustration of a first partial section through the wheel from FIGS. 1 to 3 in the region of a free space.
Figure 5:
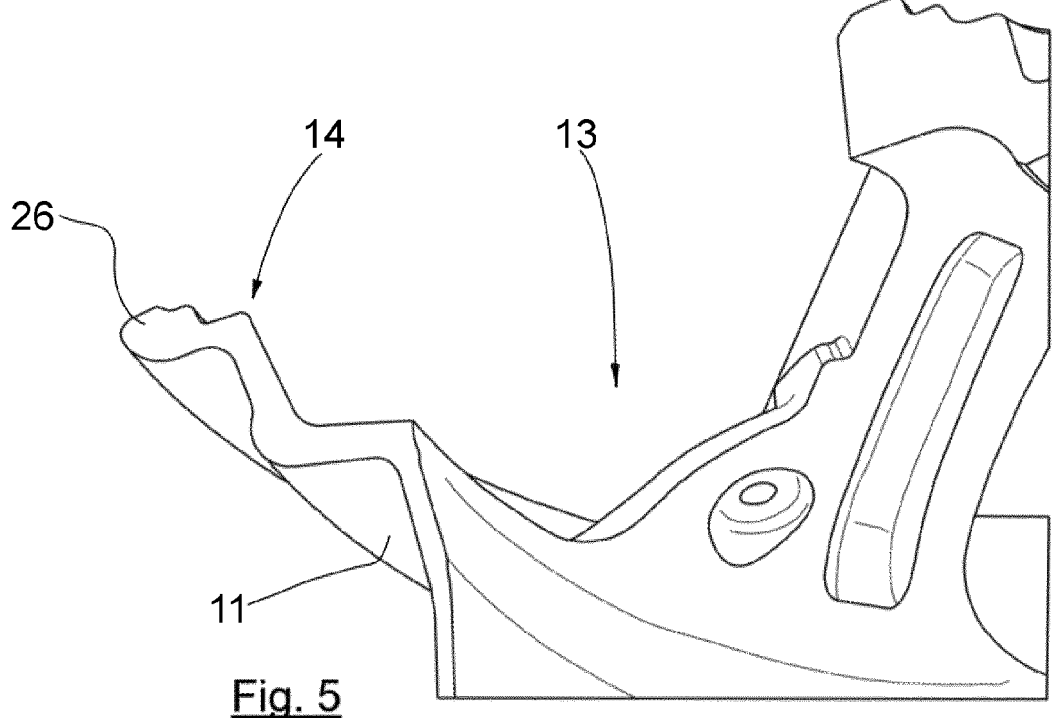
FIG. 5 is the partial section of FIG. 4 from another perspective.

FIG. 3 in this respect shows an enlarged detail of the wheel 11 from FIG. 2 in the region of a free space 13. FIG. 4 shows a perspective illustration of a first partial section through the wheel 11 from FIGS. 1 to 3 in the region of a free space 13, without the tire 24 and FIG. 5 shows the partial section from FIG. 4 from another perspective.

In this exemplary embodiment of an arrangement 10 according to the invention, the slight step 14 in particular directly adjoins an outer rim flange 26 in this case.

Figure 6:
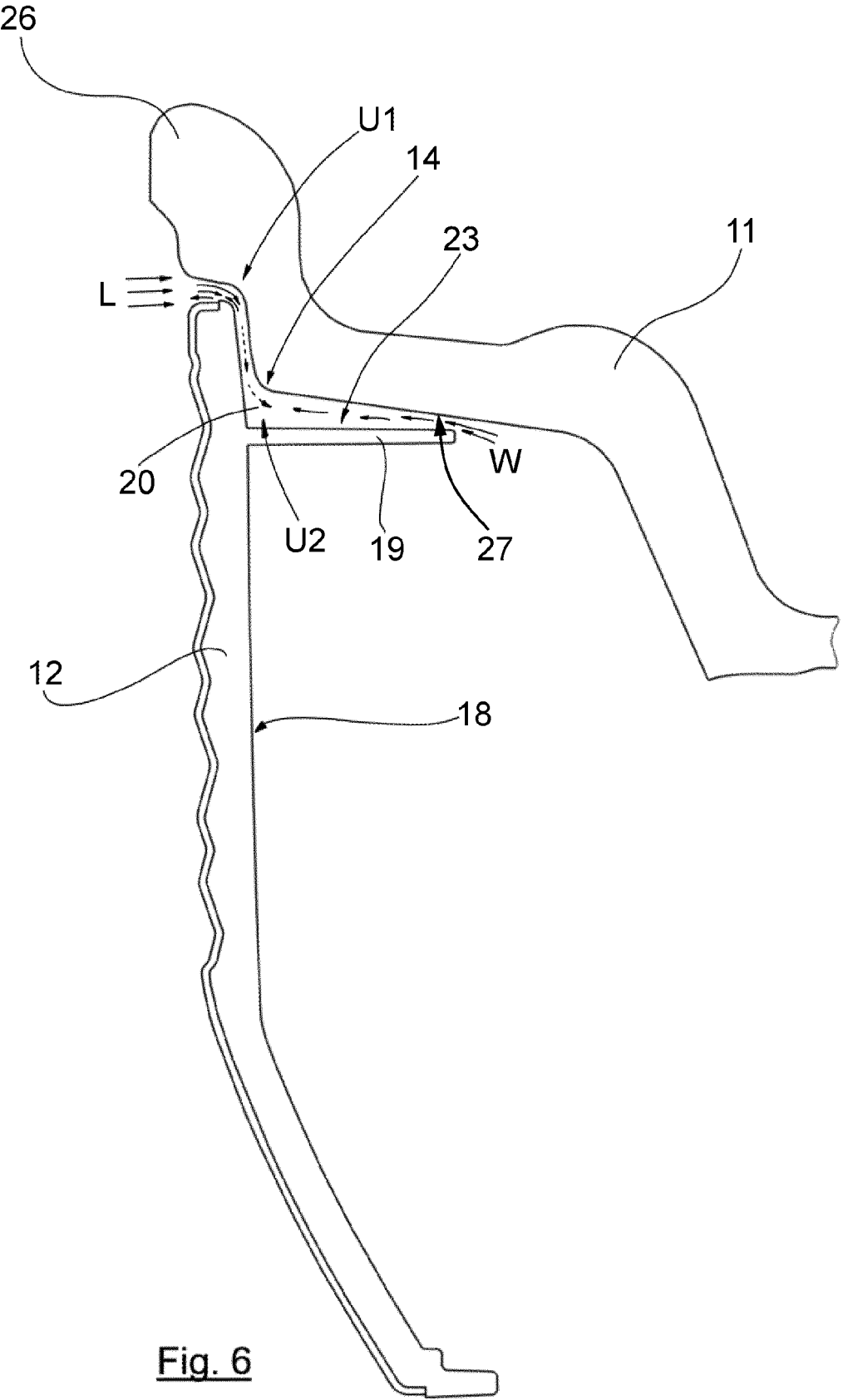
FIG. 6 is a section along a sectional plane parallel to the wheel axis of rotation through the arrangement according to the invention from FIG. 1 in the region of the gap.
Figure 7:
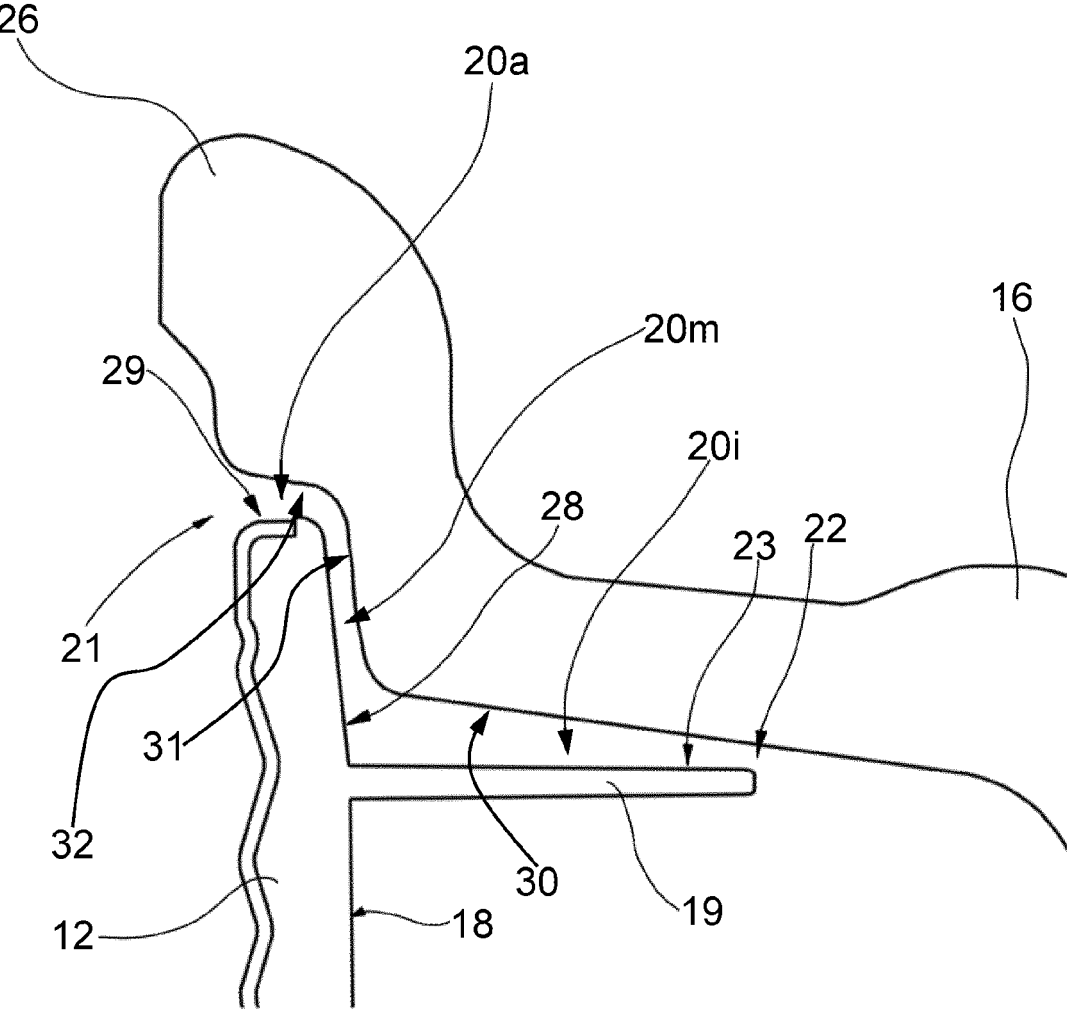
FIG. 7 is an enlarged detail of FIG. 6 in the region of the gap.

The covering elements 12 are each designed and arranged in such a way that, together with an outer surface 27 on the outer side of the rim 16, they form a gap 20 in the region of the step 14 by way of their inner surface 18, facing the rim 16, of the covering element 12, it being possible to see this particularly well in FIGS. 6 and 7.

In this respect, FIG. 6 shows a section along a sectional plane parallel to the wheel axis of rotation R through the arrangement 10 according to the invention from FIG. 1, without the tire 24, in the region of the gap 20, of which an enlarged detail in the region of the gap 20 is illustrated in FIG. 7.

According to the invention, the covering elements 12 and the rim 16 in this respect are designed in such a way that the gap 20 resulting in the region of the step 14 from the arrangement 10 of the covering element 12 relative to the rim 16 causes a 2-time or 2-fold deflection U1 and U2 of an air flow L or a fluid and/or particle flow W, passing through from the outside of the vehicle toward the inside of the vehicle or from the inside of the vehicle to the outside of the vehicle, respectively, through the gap 20 and comprising water and/or dirt and/or dust, in particular after the flow has entered the gap 20 and before it exits the gap 20 or between an inlet and outlet opening 21 of the gap 20 situated toward the outside of the vehicle and an inlet and outlet opening 22 of the gap 20 situated toward the inside of the vehicle.

In this respect, in the present case the gap 20 is in particular designed in such a way that it at least partially enables the passage of water and small dirt particles and dust particles W from an inner side of the wheel 11 toward the outside of the vehicle, but on the other hand also at least partially obstructs the passage of an air flow L from the outside of the vehicle toward the inside of the vehicle, in particular in such a way that only a proportion of less than 50% of the air mass flow L that has entered the gap 20 exits the gap 20 on the inner side of the vehicle, i.e. at the inlet and outlet opening 22 situated toward the inside of the vehicle. This makes it possible to achieve particularly advantageous aerodynamics of the arrangement 10, primarily an advantageous aerodynamic closing action of the gap 20. In particular, this makes it possible, given a correspondingly suitable, routine configuration of the arrangement 10 or a corresponding vehicle according to the invention, to reduce the Cx value of the associated vehicle by approximately two Cx points, and thus significantly.

To produce the two-fold flow deflection symbolized by the designations U1 and U2 inside the gap 20, in this exemplary embodiment the gap 20 comprises three gap portions 20a, 20m and 20i, in particular an outer gap portion 20a, a middle gap portion 20m and an inner gap portion 20i, wherein the middle gap portion 20m is arranged between the outer gap portion 20a and the inner gap portion 20i in relation to a flow direction through the gap 20.

As can be readily seen with reference to FIG. 6, in this exemplary embodiment of an arrangement 10 according to the invention, the inner gap portion 20i and the outer gap portion 20a extend substantially parallel to the wheel axis of rotation R, whereas the middle gap portion 20m runs substantially parallel to a vertical plane extending perpendicularly in relation to the wheel axis of rotation R.

The outer gap portion 20a and the middle gap portion 20m are in this case arranged relative to one another and designed in such a way that a flow passing through these two gap portions 20a and 20m has its direction deflected inside the gap 20 in particular by approximately 90°, wherein this deflection in the present case is designated first flow deflection U1.

The middle gap portion 20m and the inner gap portion 20i are likewise arranged relative to one another and designed in such a way that a flow passing through these two gap portions 20m and 20i likewise has its direction deflected by approximately 90°, but in the opposite direction, wherein this flow deflection in the present case is designated second flow deflection U2.

In this exemplary embodiment of an arrangement 10 according to the invention, in this respect the gap is formed in each case by part of the inner surface 18 of the covering element 12 through these two gap portions, wherein the inner surface 18 of the covering element 12 here extends at least partially in the radial direction and circumferential direction U of the wheel 11 and comprises a projection 19 extending away from the inner surface 18 and at least partially in the vehicle transverse direction and at least partially in the circumferential direction U, in each case in relation to a functional installation state of the wheel 11 in a vehicle.

A radial outer surface 23 of the projection 19 in this respect, together with an opposite radial inner surface 30 of the rim 16, forms the inner gap portion 20*i* of the gap. A region 28 of the inner surface 18 that lies radially on the outside of the projection 19, together with an opposite outer surface 31 of the step 14, here forms the middle portion 20*m* of the gap 20, and the outer gap portion 20*a* is formed by a radial outer surface 29 of the covering element 12 that extends at least partially in the circumferential direction U of the wheel 11, together with an opposite, radial inner surface 32 of the rim 16, which in particular directly adjoins the outer rim flange 26.

The two flow deflections U1 and U2, each by approximately 90°, makes it possible on the one hand to particularly easily influence, in particular obstruct, an air mass flow L that has entered the gap 20 in such a way that only some of the air mass flow can pass through the gap 20 and exit again on the side of the gap situated toward the inside of the vehicle, in particular in the present case only a proportion of approximately 50%. At the same time, by virtue of this configuration, sufficient runoff of water and sufficient egress of dirt and dust, symbolized by the fluid and particle flow W, through the gap 20 from the inside of the vehicle toward the outside of the vehicle can be ensured.

In the present case, this is achieved in particular by a gap 20 which extends in the flow direction over most of its length, in particular over more than half of its length, approximately in the direction of the wheel axis of rotation R, i.e. in particular runs with most of its length substantially parallel to the wheel axis of rotation L, whereas only the middle gap portion 20*m* runs substantially in the vertical direction.

Furthermore, in the case of this arrangement 10 according to the invention, a gap width of the inlet and outlet opening 21 situated toward the outside of the vehicle, which in this case is approximately 0.8 mm, is smaller than a gap width of the inlet and outlet opening 22 situated toward the inside of the vehicle, which in this example is approximately 1.2 mm.

A particularly good obstruction of the passage of an air mass flow L from the outside of the vehicle toward the inside of the vehicle can be achieved when the gap 20 is formed as in the exemplary embodiment described here and the outer gap portion 20*a* and the inner gap portion 20*i* each have decreasing gap widths in the flow direction from the outside of the vehicle toward the inside of the vehicle, whereas a gap width of the middle gap portion 20*m* slightly increases from the first flow deflection U1 to the second flow deflection U2 or remains constant.

In some cases, this even makes it possible to have the effect that an air flow L entering the gap 20 from the outer side of the wheel 11 is deflected in such a way that a large proportion of the air flow 11 exits the gap 20 back towards the outside of the vehicle again on the outer side of the wheel 11, in particular the proportion of an air flow L that has entered the gap 20 but does not exit the gap 20 on the inner side of the vehicle.

In this exemplary embodiment, the covering elements 12 here are in each case plastics injection molded parts 12 that are formed in one piece, wherein the projection 19 in the present case in particular is integrally molded in one piece with the rest of the covering element 12, in particular with its inner surface 18, and in particular is formed by a protruding rib 19 or wall 19.

For a particularly advantageous aerodynamic configuration of the arrangement 10, an outer surface, not depicted in more detail here, of one or more covering elements 12 can be structured and/or textured, for example as indicated by the zigzag structure in FIG. 6. In some cases, dimples, such as in the case of a golf ball or the like, may also be advantageous.

Figure 8:
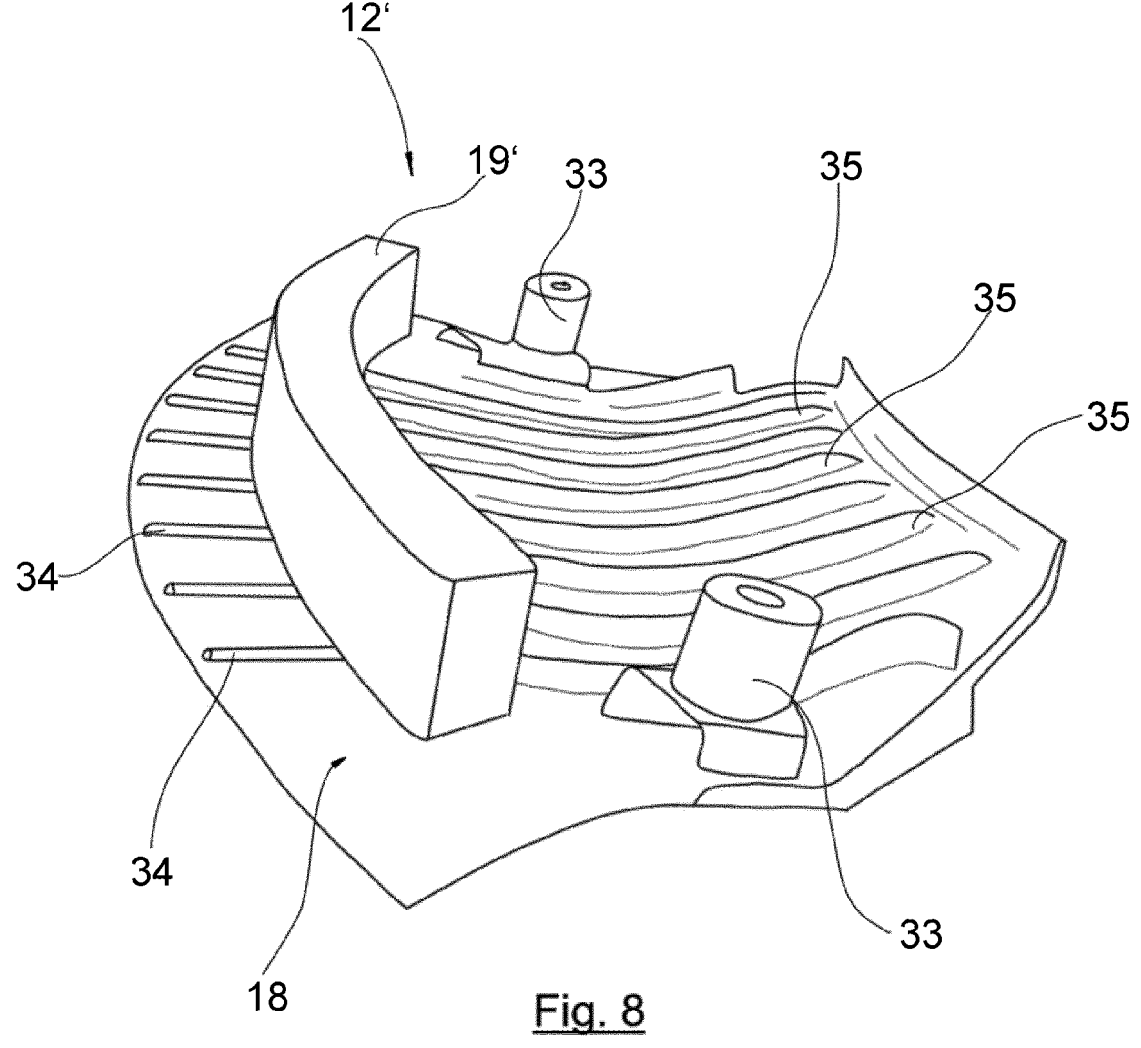
FIG. 8 is a perspective illustration of a further exemplary embodiment of a covering element according to the invention.

FIG. 8 shows a perspective illustration of a further exemplary embodiment of a covering element 12' according to the invention, wherein this covering element 12' has a foam lip 19' fastened to the inner surface 18 by adhesive bonding instead of a wall or rib 19 integrally molded in one piece with the inner surface 18.

A further difference is that this covering element 12', on the inner surface 18, additionally has reinforcing ribs 34, extending in particular in the radial direction, in the radially outer region of the inner surface 18, and ribs 35 which protrude toward the inside of the vehicle and, however, not only serve as reinforcement but in this case presently moreover act as flow conducting elements 35, in order to achieve improved water runoff or dust and dirt egress from an inner side of the vehicle toward the outside of the vehicle. The reinforcing ribs 34 likewise serve as flow conducting elements 34, in particular for the purpose of orienting an air mass flow L entering the gap 20 in order to achieve particularly advantageous aerodynamics of an arrangement according to the invention.

The covering element 12' can be fastened to a wheel 11 according to the invention using the fastening elements 33, in particular using their fastening holes 25.

That part of the covering element 12' that comprises the inner surface 18 and also the ribs or walls 34 and 35 and the fastening elements 33 is preferably likewise produced from a plastic by a plastics injection molding process.

For a particularly straightforward configuration, a covering element 12 or 12' according to the invention can alternatively, however, also be produced from a fiber-reinforced plastic.

Of course, a multiplicity of modifications, in particular design modifications, to the exemplary embodiments explained are possible without departing from the content of the patent claims.

LIST OF REFERENCE SIGNS

10 Arrangement
11 Wheel
12, 12' Covering element (sheet-like)
13 Free space
14 Step
15 Spoke
16 Rim
17 Hub
18 Inner surface of the covering element
19, 19' Projection of the covering element
20 Gap
20*a* Outer gap portion
20*m* Middle gap portion
20*i* Inner gap portion
21 Inlet and outlet opening of the gap situated toward the outside of the vehicle
22 Inlet and outlet opening of the gap situated toward the inside of the vehicle
23 Radial outer surface of the projection 24 Tire
25 Fastening hole for covering element
26 Outer rim flange
27 Outer surface of the rim
28 Region radially on the outside of the projection
29 Radial outer surface of the covering element
30 Opposite radial inner surface of the rim
31 Opposite outer surface of the step
32 Opposite radial inner surface of the rim
33 Connecting means
34, 35 Reinforcing rib, flow conducting element
L Air flow
R Wheel axis of rotation
U Circumferential direction
U1 First flow deflection in the gap
U2 Second flow deflection in the gap
W Water/dirt

The invention claimed is:

1. An arrangement, comprising:
a wheel and at least one sheet-shaped covering element, wherein
the wheel comprises a rim, a hub and multiple spokes distributed around a wheel axis of rotation in a circumferential direction,
the rim is connected to the hub by the spokes,
the wheel has a respective free space between at least two spokes that are adjacent in the circumferential direction,
the sheet-shaped covering element at least partially covers the respective free space,
wherein the free space, on an outer side of the rim in relation to a functional installation state of the arrangement in a vehicle, has a slight step on an inner edge, the slight step extending at least in certain portions along the inner edge,
wherein the covering element is configured such that an inner surface, facing toward the rim, of the covering element, together with an outer surface of the outer side of the rim, forms a gap in a region of the step, and
wherein the covering element and the rim are configured such that the gap formed in the region of the step from the arrangement of the covering element relative to the rim creates an at least two-fold deflection of a flow passing through the gap from an inside of the vehicle toward an outside of the vehicle or from the outside of the vehicle toward the inside of the vehicle.

2. The arrangement according to claim 1, wherein
the gap is configured to obstruct at least partial passage of a fluid and/or particle flow from the outer side of the wheel toward the inside of the vehicle such that only a proportion of less than one of: 70%, 60%, 50%, 40%, 30%, 20% or 10%, of a fluid and/or particle flow that has entered the gap on the outer side of the wheel reaches the inner side of the wheel.

3. The arrangement according to claim 2, wherein
the two-fold flow deflection is configured in such a way that a fluid and/or particle flow entering the gap from the outer side of the wheel is deflected such that a proportion of more than one of: 30%, 40%, 50%, 60%, 70%, 80% or 90%, of the fluid and/or particle flow that has entered the gap on the outer side of the wheel exits the gap back toward the outside of the vehicle again on the outer side of the wheel.

4. The arrangement according to claim 3, wherein
the gap extends in the flow direction at least in certain portions approximately in the direction of the wheel axis of rotation, and the gap runs at an angle of at most one of: ±30°, ±25°, ±20°, ±15°, ±10° or ±5° or ±2°, in relation to the wheel axis of rotation or parallel to the wheel axis of rotation.

5. The arrangement according to claim 1, wherein
the gap extends in the flow direction at least in certain portions approximately in the direction of the wheel axis of rotation, and
the gap runs at an angle of at most one of: ±30°, ±25°, ±20°, ±15°, =10° or ±5° or ±2°, in relation to the wheel axis of rotation or parallel to the wheel axis of rotation.

6. The arrangement according to claim 1, wherein
the gap comprises at least three gap portions:
an outer gap portion,
a middle gap portion, and
an inner gap portion, wherein
the middle gap portion is arranged between the outer gap portion and the inner gap portion in relation to a flow direction through the gap.

7. The arrangement according to claim 6, wherein
the inner gap portion and/or the outer gap portion extends in the direction of the wheel axis of rotation in an angular range of at most one of: ±60°, ±45°, ±30°, ±25°, ±20°, ±15°, ±10°, ±5° or ±2°, about the wheel axis of rotation.

8. The arrangement according to claim 6, wherein
the middle gap portion extends in the direction of a vertical plane, extending perpendicularly in relation to the wheel axis of rotation, in an angular range of at most one of: ±30°, ±25°, ±20°, ±15°, ±10°, ±5° or ±2°, in relation to said vertical plane.

9. The arrangement according to claim 6, wherein
the outer gap portion and the middle gap portion are arranged relative to one another and configured such that a flow passing through these two gap portions has its direction deflected by one of: 45°, 60°, 75°, 90°, or more than 90°, but by less than one of: 105°, 120°, 130° or 135° or 150° or 160°.

10. The arrangement according to claim 6, wherein
the middle gap portion and the inner gap portion are arranged relative to one another and configured such that a flow passing through these two gap portions has its direction deflected by one of: 45°, 60°, 75°, 90°, or more than 90°, but by less than one of: 105°, 120°, 130°, 135° or 150° or 160°.

11. The arrangement according to claim 6, wherein
the inner surface of the covering element extends at least partially in a radial direction and in the circumferential direction of the wheel and comprises a projection extending at least partially in a vehicle transverse direction and at least partially in the circumferential direction, in relation to a functional installation state of the wheel in a vehicle,
wherein a radial outer surface of the projection, together with an opposite radial inner surface of the rim, forms the inner gap portion of the gap.

12. The arrangement according to claim 11, wherein
a region of the inner surface of the covering element that lies radially on the outside of the projection, together with an opposite outer surface of the step, forms the middle portion of the gap.

13. The arrangement according to claim 12, wherein
a radial outer surface, extending at least partially in the circumferential direction of the wheel, of the covering element, together with an opposite, radial inner surface of the rim, forms the outer gap portion.

14. A sheet-shaped covering element for a wheel having a free space between adjacent spokes, and on an outer side of a rim in relation to a functional installation state in a vehicle has a slight step on an inner edge, the slight step extending at least in certain portions along the inner edge, the sheet-shaped covering element comprising:

an inner surface of the covering element, facing toward the rim, configured such that, together with an outer surface of an outer side of the rim, forms a gap in a region of the step, wherein the covering element is configured such that the gap resulting in the region of the step creates an at least two-fold deflection of a flow passing through the gap from an inside of the vehicle toward an outside of the vehicle or from the outside of the vehicle toward the inside of the vehicle.

15. A wheel for a two-track motor vehicle, comprising: a sheet-shaped covering element according to claim 14.

16. A vehicle, comprising:
a wheel; and
a sheet-shaped covering element; and
an arrangement according to claim 1.

\* \* \* \* \*